United States Patent
Kim et al.

(10) Patent No.: US 9,059,609 B2
(45) Date of Patent: Jun. 16, 2015

(54) FLAT-TYPE VIBRATION MOTOR

(71) Applicant: SAMSUNG ELECTRO-MECHANICS CO., LTD., Suwon (KR)

(72) Inventors: Yong Tae Kim, Suwon (KR); Kyung Su Park, Suwon (KR); Dong Su Moon, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 289 days.

(21) Appl. No.: 13/709,581

(22) Filed: Dec. 10, 2012

(65) Prior Publication Data

US 2013/0162115 A1    Jun. 27, 2013

(30) Foreign Application Priority Data

Dec. 23, 2011 (KR) .................. 10-2011-0141639

(51) Int. Cl.
| | | |
|---|---|---|
| H02K 7/065 | (2006.01) | |
| H02K 11/00 | (2006.01) | |
| H02K 7/06 | (2006.01) | |
| H02K 15/12 | (2006.01) | |
| H02K 1/30 | (2006.01) | |

(52) U.S. Cl.
CPC ............ *H02K 7/065* (2013.01); *H02K 11/00* (2013.01); *H02K 1/30* (2013.01); *H02K 7/063* (2013.01); *H02K 15/12* (2013.01); *H02K 2211/03* (2013.01)

(58) Field of Classification Search
CPC ...................................................... H02K 7/065
USPC ....................... 384/100; 310/81, 90
See application file for complete search history.

(56) References Cited

U.S. PATENT DOCUMENTS

| | | | |
|---|---|---|---|
| 2005/0140222 A1* | 6/2005 | Sohara ........................... 310/81 |
| 2007/0194642 A1* | 8/2007 | Yamaguchi et al. ............ 310/81 |
| 2011/0025149 A1 | 2/2011 | Kim et al. | |

FOREIGN PATENT DOCUMENTS

| | | |
|---|---|---|
| JP | 2005-192343 | 7/2005 |
| JP | 2008-235615 | 10/2008 |
| KR | 2000-0044991 | 7/2000 |
| KR | 10-2009-0060393 | 6/2009 |
| KR | 10-2011-0011417 | 2/2011 |

OTHER PUBLICATIONS

Korean Office Action issued on Jan. 8, 2013 in corresponding Korean Patent Application No. 10-2011-0141639.
Chinese Office Action issued on Oct. 20, 2014 in corresponding Chinese Patent Application No. 201210548301.9.

* cited by examiner

*Primary Examiner* — Thomas R Hannon

(57) ABSTRACT

A vibration motor includes a rotor including a winding coil, a first substrate having a circuit pattern formed on a surface thereof and electrically connected to the winding coil, and a holder coupled to the first substrate by injection molding; and a shaft including the rotor rotatably coupled thereto and forming a rotational axis of the rotor. The circuit pattern includes a sealing pattern formed along an outline of the holder.

7 Claims, 2 Drawing Sheets

FLAT-TYPE VIBRATION MOTOR

CROSS-REFERENCE TO RELATED APPLICATIONS

This application claims the priority of Korean Patent Application No. 10-2011-0141639 filed on Dec. 23, 2011, in the Korean Intellectual Property Office, the disclosure of which is incorporated herein by reference.

BACKGROUND OF THE INVENTION

1. Field of the Invention

The present invention relates to a flat-type vibration motor, and more particularly, to a flat-type vibration motor capable of significantly reducing the generation of injection burrs during an injection molding process of an injection molding material.

2. Description of the Related Art

In general, various types of vibration generation devices have been mounted in portable electronic devices such as portable phones, game machines, portable information terminals, and the like, in order to prevent inconvenience to surrounding people due to audible sounds therefrom.

In addition, generally, since a flat-type vibration motor may sufficiently vibrate in a state in which miniaturization, lightness, and slimness are implemented, the flat-type vibration motor has been widely used as a means for notifying a user of call reception in a portable terminal.

Meanwhile, recently, a touch screen in which signals are simply input by touching characters or other icons displayed on a screen, a display device of the portable terminal, with a hand or a pen has been mainly used.

In addition, in order to allow a user to feel a touch sense at the time of touching a screen of the portable terminal, an apparatus for generating vibrations may be installed in the portable terminal.

As an apparatus for generating vibrations, various vibration motors are used as a vibration source, wherein the vibration motor may be divided into a flat-type vibration motor and a cylinder-type vibration motor according to a shape thereof and be divided into a brush-type vibration motor and a brushless-type vibration motor according to the presence and absence of a brush.

Among them, since a brush flat-type vibration motor may be manufactured to have a relatively small thickness, the brush flat-type vibration motor may be advantageous for miniaturization of a mobile phone, such that the brush flat-type vibration motor is now widely used.

Generally, in the flat-type vibration motor, a rotor having a coil and a weight body eccentrically disposed on a substrate rotates about a rotational shaft, to generate vibrations. In this case, the rotational shaft and the rotor are coupled to each other by a holder formed of a resin material on the substrate.

This holder may be coupled to the substrate through injection molding. However, in the flat-type vibration motor according to the related art, an injection molding material may be leaked to the outside of a mold during an injection molding process of forming this holder. The reason is that a gap is formed in a portion in which the substrate and the mold interlock with each other due to a circuit pattern formed on the substrate.

Since the injection molding material leaked to the outside of the mold through this gap may spread across the entire substrate, the leaked injection molding material is interposed between the substrate and the coil or the weight body, causing the coil or the weight body to be seated inaccurately.

Therefore, a structure of a flat-type vibration motor capable of suppressing leakage of an injection molding material has been required.

RELATED ART DOCUMENT (Patent Document 1) Korean Patent Laid-Open Publication No. 2011-0011417

SUMMARY OF THE INVENTION

An aspect of the present invention provides a flat-type vibration motor capable of preventing an injection molding material from being leaked to the outside of a mold to thereby spread on a substrate during a manufacturing process according to the present invention.

According to an aspect of the present invention, there is provided a flat-type vibration motor including: a rotor including a first substrate having a circuit pattern formed on a surface thereof and a holder coupled to the first substrate by injection molding; and a shaft including the rotor rotatably coupled thereto and forming a rotational axis of the rotor, wherein the circuit pattern may include a sealing pattern formed along an outline of the holder.

The rotor may include a winding coil attached to the surface of the first substrate; and a weight body eccentrically attached to the surface of the first substrate.

The rotor may further include a bearing interposed between the holder and the shaft to rotatably support the shaft.

The flat-type vibration motor may further include a bracket including a shaft fixed to a central portion thereof and a second substrate and a magnet that are attached to an upper surface thereof; a case covering an upper portion of the bracket and providing an inner space; and a brush having one end fixed to a second substrate and the other end electrically connected to the rotor.

The holder may be extended toward one end portion of the first substrate to thereby be coupled to the first substrate while enclosing a side surface of the first substrate.

The rotor may include a winding coil attached to the surface of the first substrate, and the circuit pattern may be electrically connected to the winding coil.

The sealing pattern may be a dummy pattern only formed in a vicinity of the holder.

According to another aspect of the present invention, there is provide a flat-type vibration motor including: a first substrate including a weight body coupled thereto and a circuit pattern formed on a surface thereof; and a holder coupled to the first substrate, wherein the circuit pattern may be disposed between the holder and the first substrate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
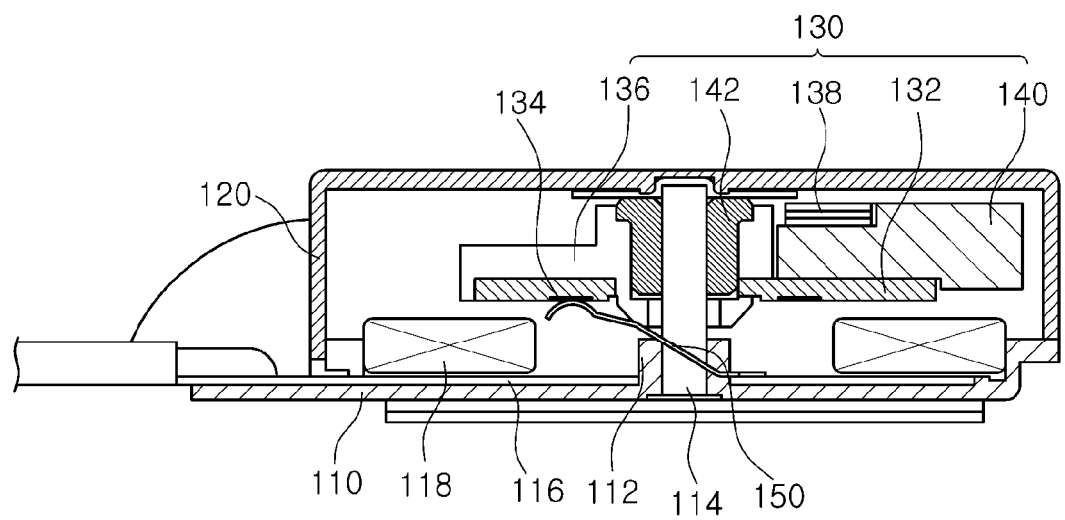
FIG. 1 is a cross-sectional view of a flat-type vibration motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
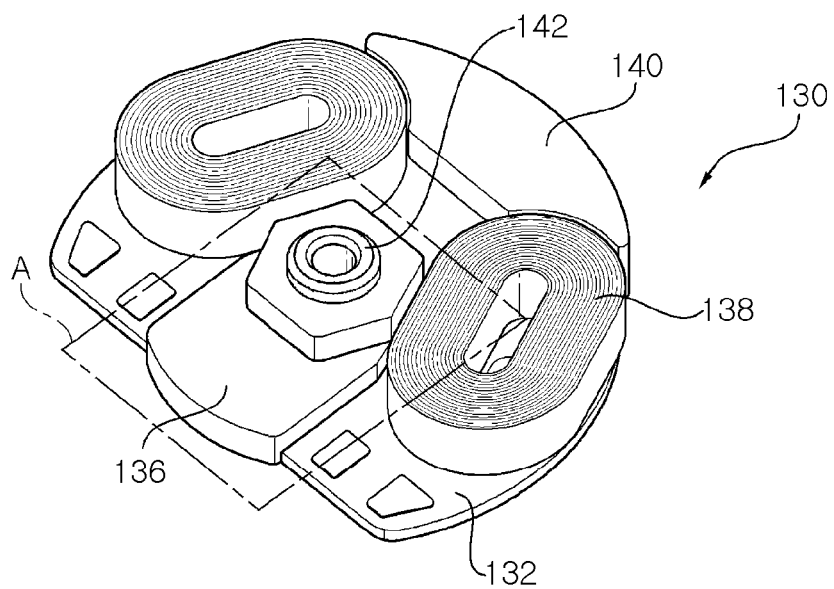
FIG. 2 is a top perspective view showing a rotor of the flat-type vibration motor shown in FIG. 1.
Figure 3:
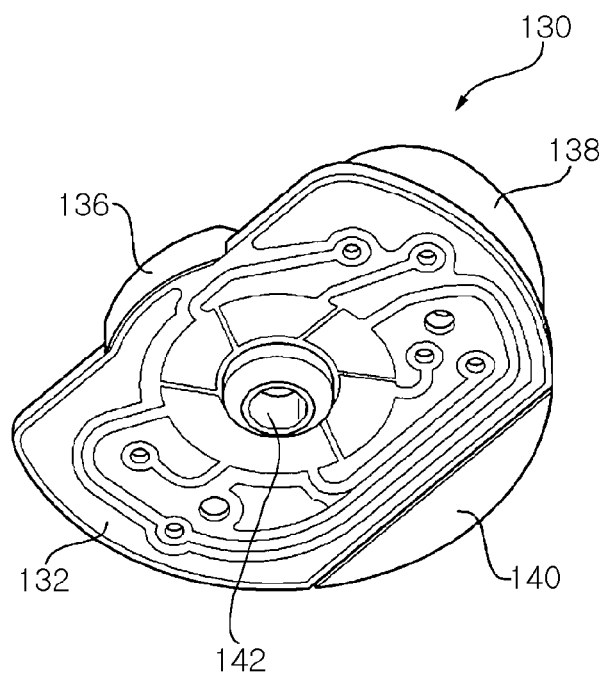
FIG. 3 is a bottom perspective view of FIG. 2.

FIG. 1 is a cross-sectional view of a flat-type vibration motor according to an embodiment of the present invention, FIG. 2 is a top perspective view showing a rotor of the flat-type vibration motor shown in FIG. 1, and FIG. 3 is a bottom perspective view of FIG. 2.

A flat-type vibration motor 100 according to the embodiment of the present invention may include a bracket 110, a case 120, a rotor 130, and a brush 150.

The bracket 110 may support other components of the vibration motor 100 and be assembled with the case 120 to provide a predetermined inner space. To this end, the bracket 110 may have a disk shape having a predetermined thickness and include a shaft 114 fixed to a central portion thereof and a lower substrate 116, a second substrate, and a magnet 118 that are attached on an upper surface thereof.

The bracket 110 may have a burring part 112 formed thereon and protruding upwardly to fix the shaft 114 thereto. Therefore, the shaft 114 may be press-fitted into the burring part 112 at a lower end thereof to thereby be fixedly coupled to the bracket 110.

The lower substrate 116 may supply power to a winding coil 138 to be described below. To this end, the lower substrate 116 may include a terminal part (not shown) electrically connected to external power.

The lower substrate 116 may be attached to the upper surface, that is, an inner surface of the bracket 110. In this case, the lower substrate 116 may be electrically connected to one end of the brush 150 to be described below.

Meanwhile, although the case in which the lower substrate 116 and the bracket 110 are individually formed and then be coupled to each other is shown in the drawings, the present invention is not limited thereto, and various embodiments thereof may be provided. For example, the bracket and the lower substrate may be manufactured integrally with each other to configure one component.

The magnet 118 may be provided to generate a magnetic field having a predetermined amount of strength to rotate the rotor 130 by interaction with the winding coil 138. The magnet 118 may be adhered to an upper portion of the lower substrate 116 through an adhesive member, or the like.

In addition, the magnet 118 may be annularly disposed based on the shaft 114 fixed to the bracket 110 in a vertical manner, and may be a permanent magnet alternately magnetized so as to have a plurality of magnetic poles in a circumferential direction thereof. In this case, the magnet 118 may be attached to face the winding coil 138 to be described below.

The case 120, a member protecting the vibration motor 100 from the outside and providing a rotational space of the rotor 130, that is, the inner space, may be coupled to the bracket 110 in such a manner that the case covers an upper portion of the bracket 110 to provide the inner space.

Here, the case 120 may be formed of a magnetic material having a high degree of permeability such that magnetic paths of magnetic flux generated in the magnet 118 and the winding coil 138 of the rotor 130 may be formed, while having strong strength such that the rotor may be not restricted by case deformation due to external force.

In addition, in the center of an inner portion of the case 120, a friction reducing member (not shown) capable of directly contacting the rotor 130 to reduce friction and noise may be provided.

Meanwhile, the case in which the bracket 110 is formed to have the disk shape, and the case 120 has a cylindrical shape corresponding thereto and is coupled to the bracket 110, thereby providing the inner space is described by way of example in the embodiment. However, the present invention is not limited thereto, but may have any shape as needed as long as the rotor 130 may smoothly rotate in the inner space.

The rotor 130, provided to rotate eccentrically to generate vibrations, may be configured to include an upper substrate 132, a first substrate, a holder 136, the winding coil 138, a weight body 140, and a bearing 142.

The upper substrate 132 is provided to support components of the rotor 130 and transmit power to the winding coil 138 and may include a through-hole formed in a central portion thereof such that the shaft 114 and the bearing 142 may be inserted thereinto.

Here, a commutator 134 may be divided into a plurality of segments, and the plurality of segments of the commutator 134 may be formed in an annular manner based on the through-hole in a lower surface of the upper substrate 132. The commutator 134 may serve to contact the brush 150 to be described below, and to transmit power to the winding coil 138. The commutator 134 may be formed by a pattern printing method, a plating method, or the like.

Further, the upper substrate 132 according to the embodiment may include a circuit pattern 132a formed on an upper surface thereof. The circuit pattern 132a may be used as a path electrically connecting the commutator 134 and the winding coil 138.

Particularly, the circuit pattern 132a according to the embodiment of the present invention may include a sealing pattern 132b formed on the upper substrate 132 to have a shape corresponding to an outline of a holder 136 to be described below.

Figure 4:
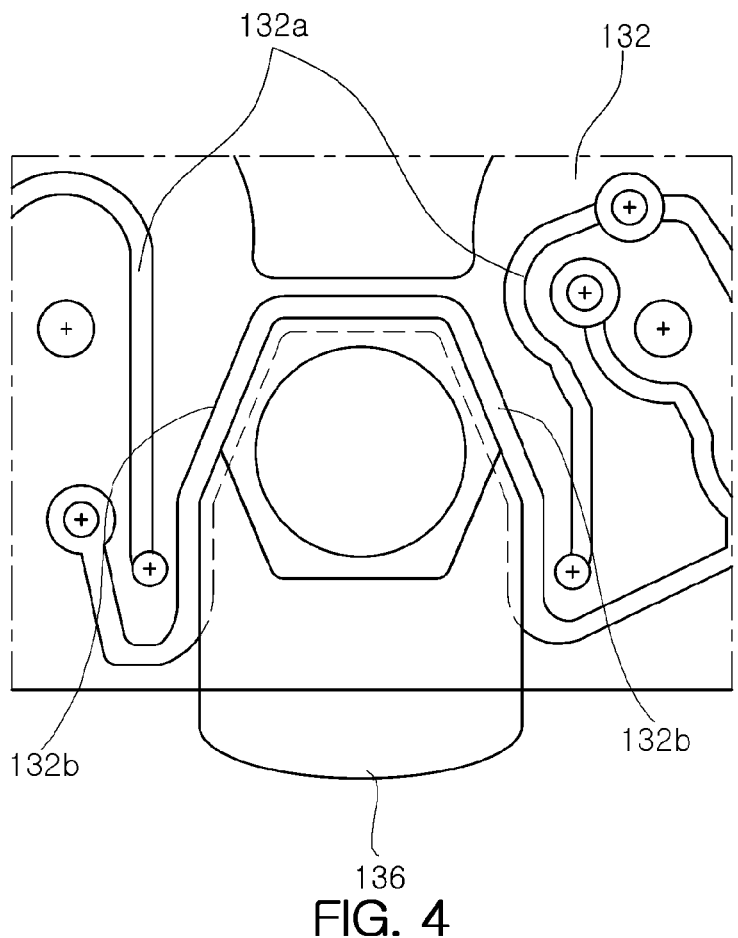
FIG. 4 is a partially enlarged plane view of part A of FIG. 2.

FIG. 4, an exploded plan view of part A of FIG. 2, shows the upper surface of the upper substrate 132 to which the holder 136 according to the embodiment of the present invention is coupled. Referring to FIGS. 1 to 4, the sealing pattern 132b according to the embodiment of the present invention may be continuously formed along a contact surface between the holder 136 and the upper substrate 132 while being interposed therebetween on the upper surface of the upper substrate 132.

As the sealing pattern 132b is interposed between the holder 136 and the upper substrate 132 as described above, since a gap is not formed in the contact surface between the holder 136 and the upper substrate 132, the holder 136 and the upper substrate 132 may be firmly coupled to each other.

A configuration of the circuit pattern 132a as described above is provided in order to prevent an injection molding material from being leaked to the outside of a mold during a process of coupling the holder 136 to the upper substrate 132. A detailed description thereof will be provided in the following description of the holder 136.

The holder 136 may be provided in order to fix the bearing 142 to the upper substrate 132.

Therefore, the holder 136 may include a groove therein such that the bearing 142 is insertedly fixed thereto.

The holder 136 may not be formed on the entire area of the upper substrate 132 but be partially formed in the vicinity of an area of the upper substrate 132 into which the bearing 142 is inserted.

Further, in order to firmly fix the holder 136 to the upper substrate 132, the holder 136 may be extended toward one end portion of the upper substrate 132 to enclose a side surface of the upper substrate 132.

Meanwhile, the bearing 142 according to the embodiment of the present invention may be lengthily formed in a length direction of the shaft 114 so as to be stably coupled to the shaft 114. Therefore, the holder 136 supporting the bearing 142 may have a height corresponding to a length of the bearing 142.

More specifically, the holder 136 according to the embodiment of the present invention may be formed in such a manner that a portion thereof formed in the vicinity of the bearing 142 protrudes from the upper surface of the upper substrate 132 to a height corresponding to the length of the bearing 142 in order to cover the length of the bearing 142. In addition, the holder 136 may penetrate through the through-hole of the upper substrate 132 to protrude downwardly of the upper substrate 132.

The holder 136 according to the embodiment of the present invention as described above may be fixedly coupled to the upper substrate 132 through an injection molding process.

That is, the holder 136 may be formed by a method of disposing the upper substrate 132 in a mold, injecting a resin solution into the mold, and hardening the injected resin solution, and at time same time, the holder 136 may be coupled to the upper substrate 132.

Meanwhile, during this process, the resin solution injected into the mold may be leaked to the outside of the mold as in the related art. However, in the vibration motor 100 according to the embodiment of the present invention, leakage of the resin solution to the outside of the mold may be suppressed using the circuit pattern 132a formed on the upper substrate 132.

As described above, in the upper substrate 132 according to the embodiment of the present invention, the sealing pattern 132b of the circuit pattern 132a may be continuously formed along the outline of the holder 136. Therefore, when the upper substrate 132 is disposed in the mold during the injection molding process, the mold may interlock with the sealing pattern 132b of the upper substrate 132.

Accordingly, the gap may not be formed between the upper substrate 132 and the mold, such that leakage of the injection molding material to the outside of the mold during the injection molding process may be prevented.

When power is applied through the commutator 134 contacting the brush 150, the winding coil 138, provided to generate an electromagnetic field having a predetermined amount of strength during the application of power, may generate the electromagnetic field and generate electromagnetic force through interaction with the magnetic field generated in the magnet 118, thereby rotating the rotor 130.

Here, at least one winding coil 138 may be attached to the upper surface of the upper substrate 132 using an adhesive member such as an adhesive or a double-side tape.

The weight body 140 is provided to add a predetermined mass such that the rotor 130 may rotate eccentrically, and at least one weight body 140 may be attached to the upper surface of the upper substrate 132 using the above-mentioned adhesive member.

The weight body 140 may be formed of a metal having a high specific gravity such as tungsten, or the like.

The weight body 140 may be disposed on the outermost circumference of the rotor 130. In this case, since an offset distance from the center of the shaft to the center of gravity of the rotor 130 increases, an amount of eccentricity may increase.

The bearing 142, rotatably supported by the shaft 120 to rotate, may be inserted into the holder 136. In this case, the bearing 142 may be fixedly coupled to the holder 136 while being forcedly fitted thereto or be fixedly adhered to the holder 136 using an adhesive.

In the rotor 130 according to the embodiment of the present invention configured as described above, the holder 136 may be coupled to the upper substrate 132 by the injection molding process in a state in which the winding coil 138 and the bearing 142 are not present.

Therefore, defects such as damage or deformation of the winding coil 138 or the bearing 142, by injection pressure and injection temperature during the injection molding process, or the like, may be prevented.

In addition, in the vibration motor 100 according to the embodiment of the present invention, the injection molding process is performed using a strip or an array state of the upper substrate 132, such that a plurality of holder-upper substrate assemblies may be formed in a one-time injection molding process. In this case, injection molding productivity may be increased (That is, manpower for injection molding may be decreased and injection molding products may be increased).

The brush 150, provided to apply power to the commutator 134, may have one end fixedly coupled to the upper surface of the lower substrate 116 and the other end elastically contacting the commutator 134 formed on the lower surface of the upper substrate 132.

In the flat-type vibration motor according to the embodiment of the present invention configured as described above, since the holder is initially formed on the upper substrate by the injection molding process and then the winding coil and the bearing are attached, damage to or deformation of the winding coil or the bearing due to a high injection temperature and injection pressure may be prevented.

In addition, according to the present invention, since the holder is not formed on the entire area of the upper substrate but formed to have a significantly small size in a range in which the bearing may be fixed, material costs may be reduced.

Further, according to the present invention, the circuit pattern of the upper substrate may have a shape corresponding to the outline of the holder. Therefore, since the mold is firmly interlocked with the circuit pattern of the upper substrate during the injection molding process, the gap may not be formed between the upper substrate and the mold, such that leakage of the injection mold material to the outside of the mold during the injection molding process may be prevented.

The flat-type vibration motor according to the present invention as described above is not limited to the above-mentioned embodiments, but various modifications may be made by those skilled in the art without departing from the spirit and scope of the present invention.

For example, the case in which the circuit pattern is formed to correspond to the outline of the holder is described byway of example in the above-mentioned embodiments. However, the present invention is not limited thereto. That is, the present invention may be variously applied. For example, a dummy pattern may be formed along the outline of the holder, separately from the circuit pattern.

In addition, although the case in which the circuit pattern is formed to correspond to the entire outline of the holder is described by way of example in the above-mentioned embodiments, the present invention is not limited thereto. That is, the circuit pattern may be partially only formed in a portion in which the winding coil and the weight body are disposed.

In the case in which the circuit pattern is configured as described above, the resin solution may be partially leaked during the injection molding process in a portion in which the mold does not interlock with the circuit pattern. However, since the leaked resin solution may spread in a direction approximately opposite to that in which the winding coil or the weight body is disposed, substantially, the leaked resin solution does not directly affect the winding coil or the weight body.

Further, although the case in which the sealing pattern has a uniform width is described by way of example in the above-mentioned embodiments, the present invention is not limited thereto. That is, the sealing pattern may have various thicknesses as long as it may be formed along the outline of the holder, and a shape of the sealing pattern may be variously modified according to positions.

Further, although the case of the upper substrate and the holder provided in the flat-type vibration motor is described by way of example in the above-mentioned embodiments, the present invention is not limited thereto, but may be variously used in any electronic device manufactured by coupling an injection molding material to a substrate through the injection molding process.

As set forth above, in the flat-type vibration motor according to the present invention, since the holder is first formed on the upper substrate by the injection molding process and then the winding coil and the bearing are attached thereon, damage or deformation of the winding coil or the bearing by high injection temperature and injection pressure can be prevented.

In addition, according to the present invention, since the holder is not formed in the entire area of the upper substrate but formed to be significantly small within a range of area in which the bearing may be fixed, material costs may be reduced.

Further, according to the present invention, the circuit pattern of the upper substrate may have a shape corresponding to the outline of the holder. Therefore, since the mold is firmly interlocked with the circuit pattern of the upper substrate during the injection molding process of the holder, the gap may not be formed between the upper substrate and the mold, such that leakage of the injection mold material to the outside of the mold during the injection molding process can be prevented.

While the present invention has been shown and described in connection with the embodiments, it will be apparent to those skilled in the art that modifications and variations can be made without departing from the spirit and scope of the invention as defined by the appended claims.

What is claimed is:

1. A flat-type vibration motor comprising:
    a rotor including a winding coil, a first substrate having a circuit pattern formed on a surface thereof and electrically connected to the winding coil, and a holder coupled to the first substrate by injection molding; and
    a shaft including the rotor rotatably coupled thereto and forming a rotational axis of the rotor,
    wherein the circuit pattern includes a sealing pattern formed along an outline of the holder.

2. The flat-type vibration motor of claim 1, wherein the rotor includes
    a weight body eccentrically attached to the surface of the first substrate.

3. The flat-type vibration motor of claim 1, wherein the rotor further includes a bearing interposed between the holder and the shaft to rotatably support the shaft.

4. The flat-type vibration motor of claim 1, further comprising:
    a bracket including the shaft fixed to a central portion thereof and a second substrate and a magnet that are attached to an upper surface thereof;
    a case covering an upper portion of the bracket and providing an inner space; and
    a brush having one end fixed to a second substrate and the other end electrically connected to the rotor.

5. The flat-type vibration motor of claim 1, wherein the holder is extended toward one end portion of the first substrate to thereby be coupled to the first substrate while enclosing a side surface of the first substrate.

6. The flat-type vibration motor of claim 1, wherein the winding coil is attached to the surface of the first substrate.

7. A flat-type vibration motor comprising:
    a winding coil;
    a first substrate including a weight body coupled thereto and a circuit pattern formed on a surface thereof and electrically connected to the winding coil; and
    a holder coupled to the first substrate,
    wherein the circuit pattern is disposed between the holder and the first substrate.

* * * * *